Dec. 17, 1940.  H. P. GUILLO  2,225,446
LIQUID-DISPENSING SYSTEM
Filed Feb. 3, 1939  2 Sheets-Sheet 1
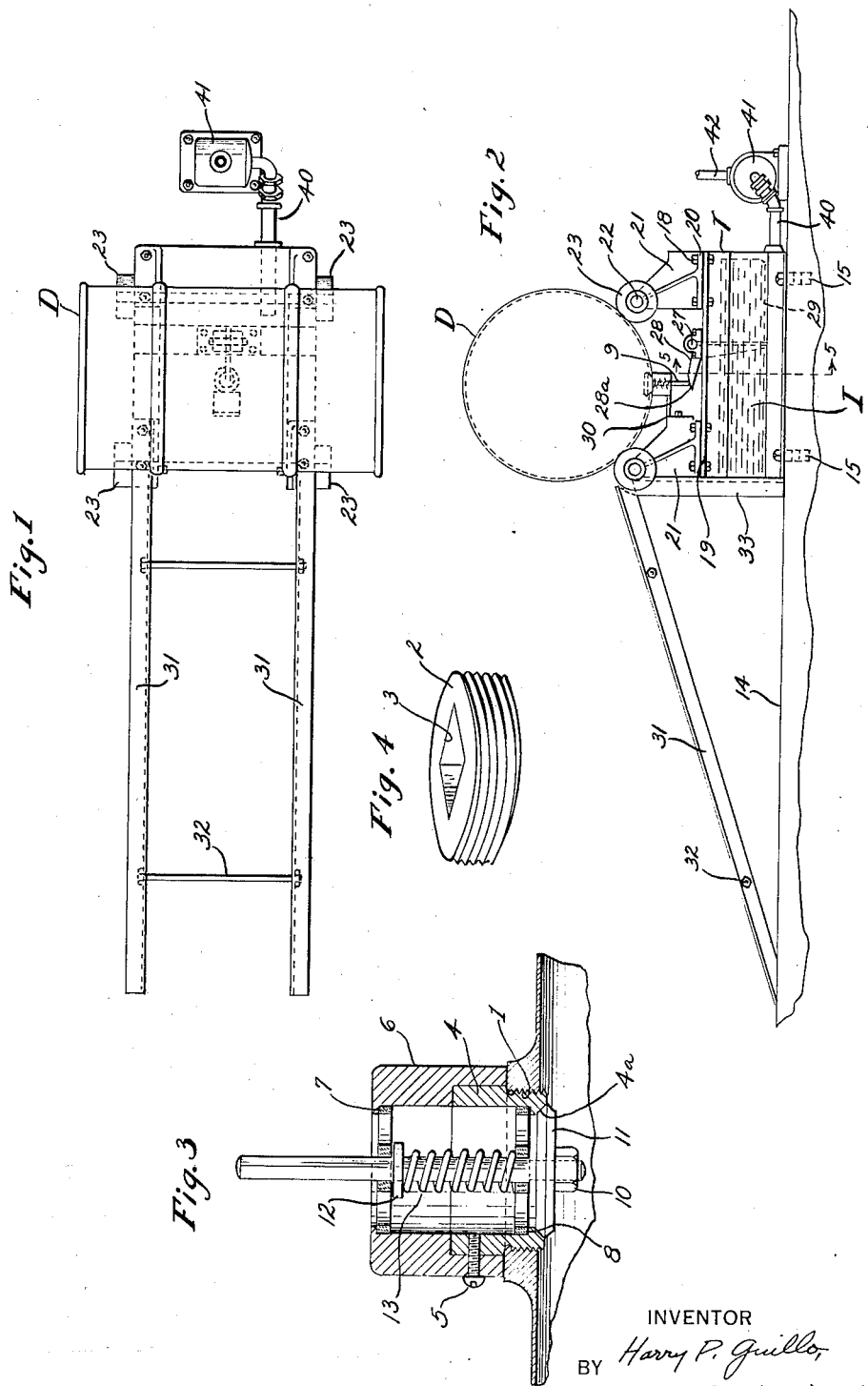
INVENTOR
BY Harry P. Guillo,
Ward, Crosby & Neal
ATTORNEYS Dec. 17, 1940.   H. P. GUILLO   2,225,446
LIQUID-DISPENSING SYSTEM
Filed Feb. 3, 1939   2 Sheets-Sheet 2
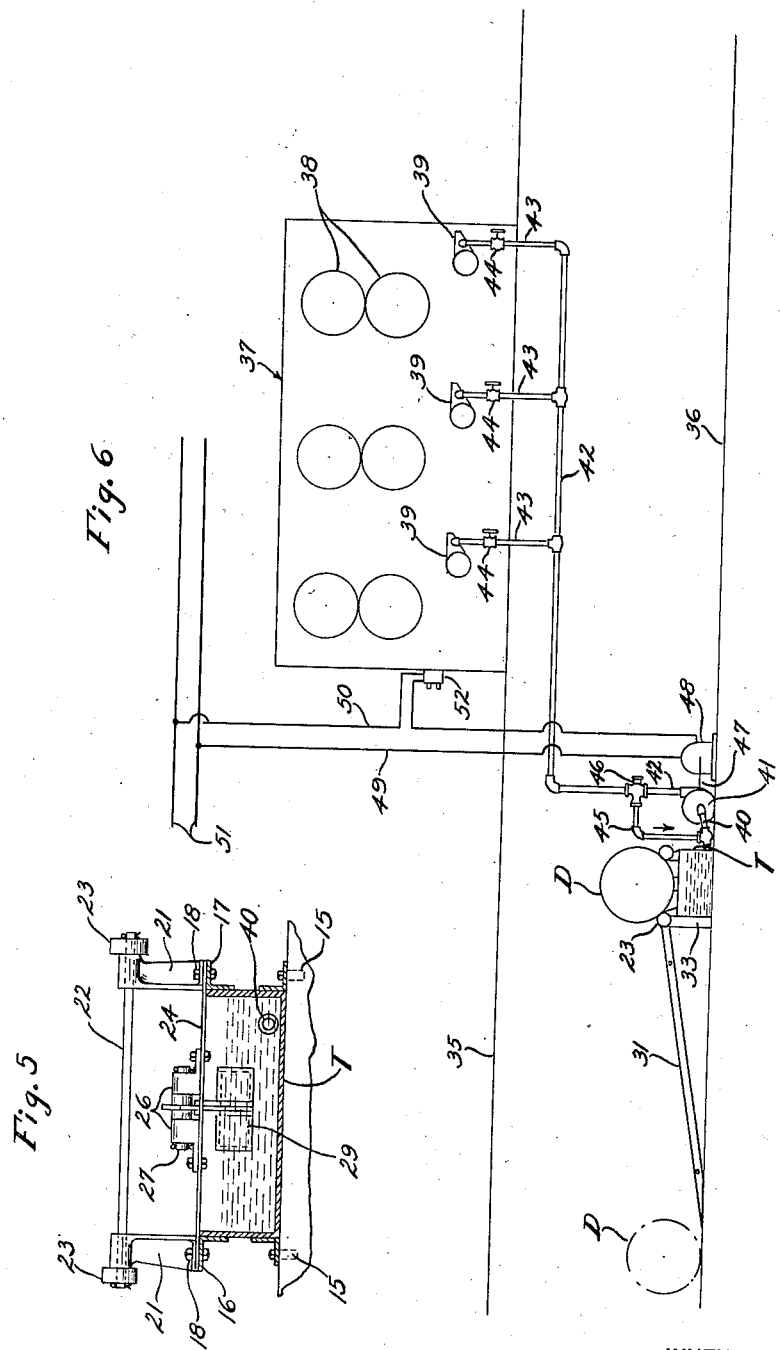
INVENTOR
BY *Harry P. Guillo*
*Ward, Crosby & Neal*
ATTORNEYS Patented Dec. 17, 1940

2,225,446

UNITED STATES PATENT OFFICE 2,225,446

LIQUID-DISPENSING SYSTEM

Harry P. Guillo, New York, N. Y., assignor to General Printing Ink Corporation, New York, N. Y., a corporation of Delaware Application February 3, 1939, Serial No. 254,345

6 Claims. (Cl. 221—69)

My invention relates to a liquid-dispensing system of the type wherein liquid is passed from a liquid-containing drum to a tank or other reservoir.

My invention has particular reference to a system for auomatically supplying a tank with ink so that, from the tank, the ink may be passed to a printing press as desired.

Various other objects, advantages and features of my invention will become apparent from the following description.

My invention resides in the liquid-dispensing system, arrangements, features and method of dispensing a liquid as hereinafter described and claimed.

For an understanding of my invention and for an illustration of one of the forms thereof, reference is to be had to the accompanying drawings, in which:

Figure 1 is a plan view of a liquid-dispensing system as constructed in accordance with my invention;

Fig. 2 is an elevational view of the system shown in Fig. 1;

Fig. 3 is a vertical sectional view, partly in elevation, showing a valve mechanism associated with a drum;

Fig. 4 is a perspective view of a bung or stopper;

Fig. 5 is a transverse vertical sectional view, partly in elevation, taken on the line 5—5 of Fig. 2 looking in the direction of the arrows; and Fig. 6 is a schematic view illustrating an application of the invention.

Referring to the drawings, there is shown a drum or container D such, for example, as is customarily used for transporting ink. As is well understood in the art, a drum D of the character described is provided with an internally threaded passage or bilge 1 adapted to receive an externally threaded bung or stopper 2 which, ordinarily, is provided with a recess 3 having angular sides adapted to receive a suitable wrench.

When the ink in the drum D is to be dispensed, the bung 2 is removed from the bilge 1 and a check valve mechanism substituted therefor. This check valve mechanism may be of any suitable character and is shown herein as comprising a tubular member 4 comprising an externally threaded section adapted to be threaded to the internal threads of the bilge 1. As shown in Fig. 3, the lower end of the tubular member 4 is of tapered configuration as indicated at 4a so as to form a valve seat. The tubular member 4 has suitably secured thereto, as by one or more screws 5, a valve shell 6 which, together with the tubular member 4, form seats for the respective guide rings 7 and 8 which are suitably seated in fixed position. As illustrated in Fig. 3, each of the guide rings 7 and 8 is provided with a central passage and these passages are alined longitudinally of the valve structure for the free slidable reception of a valve stem 9 which, at its lower end, carries a nut 10 securing thereto a valve disk 11 adapted, at its peripheral edge, to coact with the aforesaid valve seat 4a. The valve stem 9 has fastened thereto a disk 12, between which and the lower ring 8, a helical spring 13 is confined, this helical spring, as will be obvious, continuously biasing the stem 9 in such direction that the valve disk 11 tends to remain on its seat 4a.

In Fig. 2, I have shown a horizontal surface 14 such, for example, as the floor surface of a room or which may be such other surface as desired. Resting upon this surface 14 and suitably secured thereto if necessary, as by the bolts 15, is a sump tank or container T which, at opposite sides thereof, may have the respective angle members 16 and 17 welded or otherwise suitably secured thereto, Fig. 5. Suitably secured, as by bolts 18, to these angle members 16 and 17 are a pair of spaced plates 19 and 20, each of these plates having a pair of spaced standards 21, 21 projecting upwardly therefrom. Each set of the standards 21, 21 forms a support for a fixed axle 22 having a pair of spaced rollers or wheels 23 journaled thereon preferably by anti-friction bearings, not shown, the arrangement being such that the axles 22 are disposed in parallel relation as shown in Figs. 1 and 2.

Referring to Figs. 1, 2 and 5, the aforesaid angle members 16 and 17 are shown as supporting a plate 24 to which, by bolts 25, is secured a bearing structure 26 for the trunnions 27 of a bell crank lever 28, one arm of which extends downwardly into the tank T and carries a suitable float 29. The other arm of the bell crank lever 28 extends approximately horizontally and termintes in an upwardly facing inclined surface 28a utilizable as hereinafter described. When the tank T is filled with ink as shown in Fig. 2, the float 29 retains the lever surface 28a approximately in the position shown. However, when said tank T is empty or only partially filled, the effect of gravity on the lever-float arrangement is such that said lever surface 28a is disposed at a higher level than as shown in Fig. 2.

Suitably secured to the aforesaid plate 19 is an angle member 30 or equivalent, the projecting end of which serves as a stop surface limiting rotation of the drum D. This feature of the invention will be hereinafter described in detail.

As shown in Figs. 1 and 2, a pair of ramp rails or skids 31, 31 may be disposed at one side of the tank T, the upper surfaces of these rails at the upper ends thereof coinciding substantially with the upper surfaces of one set of the rollers 23, 23. As illustrated, the rails 31, 31 may be maintained in parallel relation by tie rods 32 and the lower ends thereof may rest upon the aforesaid surface 14, the upper ends of said rails 31, 31 being supported by the respective standards 33 which are maintained in vertical relation in any suitable manner.

In operation, a drum D filled with ink is rolled along the surface 14 to the lower ends of the ramp rails 31 whereupon said drum D is rolled upwardly along said ramp rails and onto the two sets of rollers 23, 23 which form a cradle for the reception of the drum. Then, with the bilge 1 disposed upwardly, the bung 2 is removed and the described check valve mechanism substituted therefor, this being accomplished by threading the tubular member 4 to the bilge threads. When this has been done, the drum bilge 1 is closed by reason of the fact that the spring 13 holds the valve disk 11 on its seat 4a.

After the check valve mechanism has been substituted for the bung 2, the drum D is moved rotatably on the rollers 23 until the valve shell 6 comes into contact with the stop member 30, Fig. 2. Just prior to the time the valve shell 6 thus engages the stop member 30, the valve stem 9, provided that the tank T is empty or only partially filled with ink I, comes into engagement with the inclined surface 28a of the bell crank lever 28. When this happens, the valve disk 11 is moved from its seat 4a against the force of the spring 13 and ink I flows from the drum D into the tank T, such flow continuing until, under the control of the float 29, the bell crank lever 28 moves counter-clockwise to the position shown in Fig. 2 wherein the spring 13 becomes effective to move the valve disk 11 onto its seat 4a. Thus, in the automatic manner described, the tank T remains filled with ink so long as there is a supply thereof in the drum D. It will be understood that, in practice, the float-bell crank arrangement is weighted to such extent that the bell crank lever 28, when in its clockwise position, Fig. 2, is effective to overcome the force of the spring 13.

As illustrative of one of the many applications of my invention, I have shown in Fig. 5 upper and lower floors 35 and 36 of a building, the arrangement of my invention being disposed on the lower floor 36 and a printing press 37 being disposed on the upper floor 35. The printing press 37 is illustrative of any printing press which may be suitable for the desired use and is shown herein as comprising a plurality of printing couples 38 with each of which is associated an ink fountain 39.

As shown on the drawings, a conduit 40 leads from the bottom of the tank T to the inlet of a pump 41 from the outlet of which extends a conduit 42 from which branch the feeder conduits 43 for the respective ink fountains 39, each of said conduits 43, preferably, having a control valve 44 associated therewith. As shown, the inlet and outlet sides of the pump 41 should be connected by a by-pass conduit 45, the connection of which to the conduit 42 is controlled by a spring-loaded valve 46 of known type.

As indicated in Fig. 5, the hereinbefore described pump 41 is operated by a shaft 47 connected to the armature of a suitable electric motor 48 which, by conductors 49 and 50, receives power from any suitable supply line 51. One of the motor conductors 49 or 50 has included in the circuit thereof a suitable switch 52 which is mounted in any convenient location preferably adjacent the printing press 37.

As hereinbefore described, the tank T, in an automatic manner, remains filled with ink so long as there is a supply thereof available in the drum D. Accordingly, when it becomes necessary to furnish ink to one or more of the fountains 39, the operator opens the proper valve or valves 44 and then closes the switch 52. As a result, under the control of the motor 48, the pump 41 operates to withdraw the ink from the tank T and force the same along the conduits 42 and 43 to the printing press fountain or fountains which are to be supplied with ink. As soon as the proper amount of ink has been pumped, the motor circuit is opened at the switch 52.

In case operation of the motor 48 should be initiated while all of the valves 44 are closed, the effect of the spring forming a part of the valve 46 is overcome so that ink circulates through by the by-pass conduit 45.

Although not shown on the drawings, it will be understood that, if desired, a suitable switch may be secured to the movable float mechanism, this switch being closed if the float should move somewhat above the level at which the valve disk 11 engages its seat 4a. Therefore, if for any reason, the valve disk 11 should not be properly seated with consequent leakage into the tank T, an alarm will be sounded to notify an attendant of this condition.

In view of the foregoing, it will be recognized by those skilled in the art that the dispensing system of my invention is convenient in operation and well adapted for readily supplying ink to the small printing establishment. A filled drum D may readily be positioned on the cradle formed by the rollers 23 and, after the check valve mechanism has been attached to said drum and the latter positioned as shown in Fig. 2, it is only necessary to actuate the switch 52 in order to deliver ink as required to the printing press. This is highly advantageous.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, a support on which a liquid-containing drum is mounted for rotatable movement with respect to its horizontally disposed longitudinal axis, valve mechanism associated with the bilge of said drum and comprising an actuating member movable along an arcuate path when said drum is rotated on its support, a tank below said support, a movable member, and a float for moving said movable member into and out of the path of said actuating member.

2. In combination, a support on which a liquid-containing drum is mounted for rotatable movement with respect to its horizontally disposed longitudinal axis, valve mechanism associated with the bilge of said drum, a tank below said support, a movable member for actuating the valve mechanism when it faces toward said tank, and a float responsive to the level of liquid in said tank for moving said movable member into actuating position with respect to said valve mechanism.

3. In combination, a support on which a liquid-containing drum is mounted for rotatable movement with respect to its horizontally disposed longitudinal axis, valve mechanism associated with the bilge of said drum and comprising an actuating member movable along an arcuate path when said drum is rotated on its support, a tank below said support, a pivoted member, a float connected to said pivoted member for moving the same into and out of the path of said actuating member, and a stop member for discontinuing rotation of said drum on its support as said actuating member moves into engagement with said pivoted member.

4. In combination, a support, roller means carried by said support for supporting a liquid-containing drum for rotatable movement with respect to its horizontally disposed longitudinal axis, valve mechanism associated with the bilge of said drum and comprising a stem projecting outwardly beyond the periphery of said drum, a tank below said support, and a float in said tank and having a member movable therewith, rotation of said drum on said support causing said stem to engage said member.

5. In combination, a support comprising a plurality of sets of rollers, ramp rails extending to said support whereby a liquid-containing drum may be rolled onto said support with its longitudinal axis disposed horizontally, valve mechanism associated with the bilge of said drum and comprising a stem projecting outwardly beyond the periphery of said drum, a tank below said support, and a float in said tank and having a member movable therewith, rotation of said drum on said support causing said stem to engage said member.

6. In combination, a tank mounted in fixed position, plates secured to the respective opposite sides of said tank, a standard arrangement rising from each plate, a pair of spaced wheels carried by each standard arrangement and forming a support on which a liquid-containing drum is adapted to be mounted for rotatable movement, a transverse member carried by said tank, a bearing structure carried by said transverse member, a bell crank lever journaled on said bearing structure, and a float carried by one end of said bell crank lever, the other end of said bell crank lever being adapted to actuate a valve mechanism carried by said drum.

HARRY P. GUILLO.